Nov. 28, 1967   W. G. HOLZ   3,354,735
TRACTION-FACE ARRANGEMENT FOR DRUM-TYPE PULLEYS
Filed Feb. 7, 1966
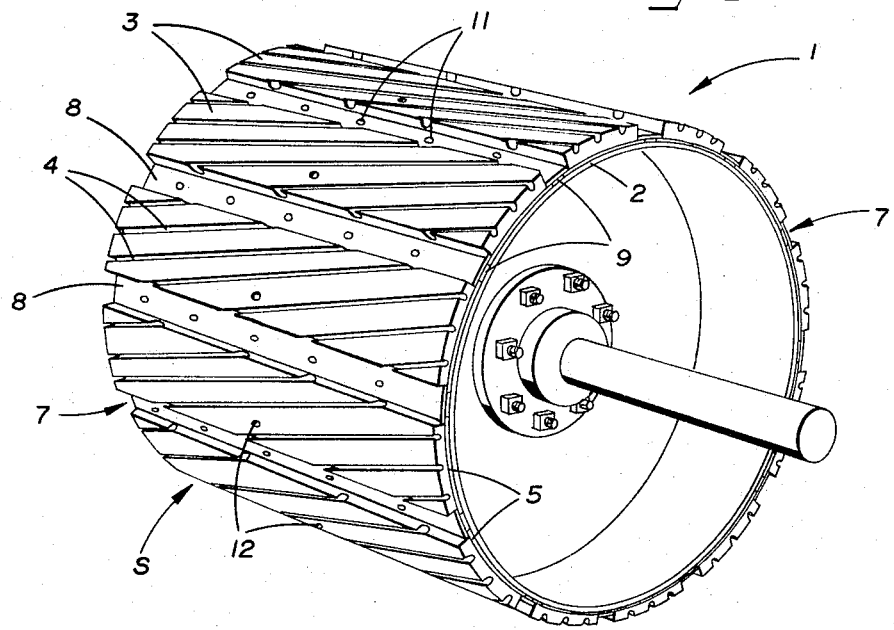
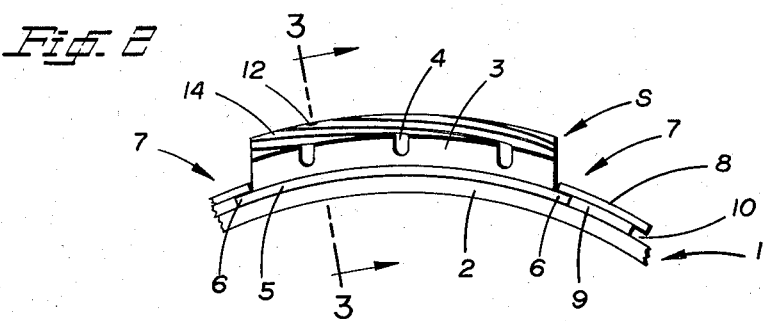
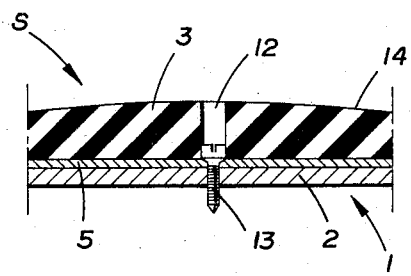
INVENTOR.
William G. Holz
BY
Webster & Webster
ATTORNEYS

United States Patent Office 3,354,735
Patented Nov. 28, 1967

3,354,735
TRACTION-FACE ARRANGEMENT FOR
DRUM-TYPE PULLEYS
William G. Holz, P.O. Box 109, Lodi, Calif. 95240
Filed Feb. 7, 1966, Ser. No. 525,673
3 Claims. (Cl. 74—230.7)

ABSTRACT OF THE DISCLOSURE

A traction-face arrangement, for a smooth-faced belt-driving pulley, comprising a plurality of initially separate traction sections extending across the pulley face and disposed in adjacent but spaced relation circumferentially thereof; there being means removably securing the traction sections to the pulley.

This invention relates to belt-engaging pulleys, and particularly to wide-faced or drum-type drive pulleys such as are employed in various industries to drive heavy-duty endless belts.

With such pulleys, if smooth-faced, the engaged belt must be quite tight if possible slippage is to be avoided and even then such slippage may occur if the load is unduly heavy.

To meet such problem, it has heretofore been the practice to provide the pulley with a traction face or lagging of rubber or the like, but the manner of attachment to the metal face of the pulley has not been entirely satisfactory.

One such manner of attachment consisted in vulcanizing a continuous traction face of rubber directly on the metal face of the pulley; this, however, having required that the pulley be removed and shipped to a rubber vulcanizing plant for replacement—when worn or damaged—of the traction face. This involved an excessive cost in labor and loss of time.

Efforts also have been made to provide a replaceable traction face by means of a continuous, fabric-backed rubber sheet secured to the metal face of the pulley by bolting or cementing. This, too, was not satisfactory either from the standpoint of the economy of replacement, or efficiency of operation; the rubber sheet—tending to flex—did not always conform to the drum surface, and separation of the rubber from the fabric backing frequently occurred. For these and other reasons, operation was not always efficient and damage to the belt sometimes resulted.

It is, therefore, the major object of the present invention to avoid the problems of the presently employed methods of traction-facing a smooth-faced metal pulley by providing a plurality of individual pulley-engaging traction sections which are effectively and positively applied thereto in a novel manner and yet so that any one of the sections—when worn or damaged—may be removed and replaced without disturbing the other sections or having to remove the pulley from its shaft or bearings.

An additional object of the invention is to provide a traction-face arrangement for drum-type pulleys which assures of maximum traction with minimum belt wear, and is self-cleaning.

A further object of the invention is to form the traction sections in such a manner that they will provide a crown on a flat-faced pulley, or—in a modified form—so that they may be applied to a pulley already having a crown.

A further object of the invention is to provide a traction-face arrangement for drum-type pulleys which is designed for economy of manufacture, and ease of installation or replacement.

A still further object of the invention is to provide a practical, reliable, and durable traction-face arrangement for drum-type pulleys and one which is exceedingly effective for the purpose for which it is designed.

These objects are accomplished by means of such structure and relative arrangement of parts as will fully appear by a perusal of the following specification and claims.

In the drawings:

FIG. 1 is a perspective view of a wide-faced or drum-type pulley, equipped with the improved traction-face arrangement.

FIG. 2 is a fragmentary enlarged end elevation of the pulley as so equipped.

FIG. 3 is a fragmentary enlarged transverse section taken on line 3—3 of FIG. 2.

Referring now more particularly to the drawings and to the characters of reference marked thereon, the drum-type pulley 1, to which the improved traction-face arrangement is applied, includes a smooth-faced metal drum 2. The traction face, which is applied to the drum, is made up of a plurality of separate sections S; each section including a pad 3 which is rectangular in form, of a width the same as that of the drum, and of a predetermined length or arcuate extent circumferentially of the drum.

The pads 3 are relatively thick and are molded of a suitable grade of heavy duty, abrasion-resistant rubber or similar traction material; the traction qualities being increased by diagonal grooves 4 formed in the outer faces of the pads. If desired, these grooves may be formed so that they all lead to inner end terminations in the central transverse plane of the pulley.

Each pad 3 is permanently bonded, as by vulcanizing, on a backing plate 5 of metal or a suitable grade of plastic or the like; such plate being pre-shaped to conform to the curvature of the drum 2. The backing plate 5 is rectangular in plan and—while the same width as the pad 3 and drum 2—is somewhat longer than the pad in a direction circumferentially of the drum so as to leave flanges or lips 6 projecting over the drum in such direction and beyond corresponding edges of the pad.

Guide and retaining members 7 for the traction sections S are mounted—between adjacent sections—on the drum 2. Each such member comprises a rigid strip 8 extending full width across the drum and overlying the flanges 6 of adjacent sections S, and a narrower spacer strip 9 (substantially the same thickness as the plate 5 and its flanges) is disposed between the strip 8 and the drum 2; this assembly thus forming grooves 10 along which the flanges 6 may slide with a close fit. The strips 8 and 9 are welded to each other as a unit, and said unit is then welded onto the drum; the unit being provided with holes 11 therethrough at spaced intervals along its length, as indicated in FIG. 1, to receive the welding metal.

Each section S, at a suitable point in its width and between adjacent grooves 4 of the pad 3, is formed with a hole 12 which also extends through the plate 5. A corresponding hole is drilled through the drum 2 to receive a self-tapping screw 13 as shown in FIG. 3. In this manner, the sections S are held against possible movement on the drum after being slid into place under the flanges 6 and from one end of said drum. Also, the sections can be readily and individually detached from the drum and replaced after the simple expedient of removing the screws 13.

In the event that the sections S are designed to be mounted on a flat-faced or uncrowned drum 2 as here shown, the pads 3 are formed with the necessary crown as indicated at 14. If, however, the drum in its original form is already crowned, it will obviously be necessary to make each section S in two halves, separated along the apex of the crown, so that each section half may be slid to its in-place position from the corresponding end of the drum. In the latter case, the pads may be molded with their radially outer and inner faces parallel to each other.

The term "pulley" as used herein shall be deemed to include rolls of various kinds, such as feed rolls, and to which the present invention is readily adaptable.

From the foregoing description, it will be readily seen that there has been produced such a traction-face arrangement for drum-type pulleys as substantially fulfills the objects of the invention, as set forth herein.

While this specification sets forth in detail the present and preferred construction of the traction-face arrangement for drum-type pulleys, still in practice such deviations from such detail may be resorted to as do not form a departure from the spirit of the invention, as defined by the appended claims.

Having thus described the invention, the following is claimed as new and useful and upon which Letters Patent is desired:

1. A traction-face structure, for a smooth-faced belt-driving pulley, comprising a plurality of initially separate traction sections each extending circumferentially of the pulley so that together they substantially completely surround the pulley, and means removably holding each section in position on the pulley independently of the other section; each section comprising a pad of traction material and a rigid backing plate on which the pad is secured, the plate extending beyond the edges of the pad circumferentially of the pulley to provide projecting flanges; said means including a strip member extending transversely of and secured on the pulley between adjacent sections and forming, with the pulley face, grooves to receive the corresponding flanges in close sliding relation.

2. A structure, as in claim 1, including a removable securing element between each section and the pulley.

3. A structure, as in claim 2, in which said element is a recessed screw disposed radially of the pulley; said screw projecting through the corresponding section and being removably screwed into the pulley.

References Cited

UNITED STATES PATENTS

| | | | |
|---|---|---|---|
| 486,631 | 11/1892 | Crossley | 74—230.7 |
| 986,712 | 3/1911 | Hipp | 74—216 X |
| 1,040,993 | 10/1912 | Bakke | 74—230.7 X |
| 2,287,488 | 6/1942 | Ross | 74—230.7 |
| 2,701,971 | 2/1955 | Carter et al. | 74—230.7 |
| 3,010,332 | 11/1961 | Skates | 74—230.7 |

FOREIGN PATENTS

| | | |
|---|---|---|
| 177,298 | 1/1954 | Germany. |
| 702,974 | 1/1954 | Great Britain. |

FRED C. MATTERN, JR., Primary Examiner.

J. A. WONG, Assistant Examiner.